No. 704,423. Patented July 8, 1902.
B. W. ALLEN.
WALL PLATE OR SHIELD FOR ELECTRIC WIRES.
(Application filed Feb. 26, 1902.)

(No Model.)

WITNESSES:

INVENTOR:
Boyd W. Allen,
By his Atty.

UNITED STATES PATENT OFFICE.

BOYD W. ALLEN, OF BOSTON, MASSACHUSETTS.

WALL-PLATE OR SHIELD FOR ELECTRIC WIRES.

SPECIFICATION forming part of Letters Patent No. 704,423, dated July 8, 1902.

Application filed February 26, 1902. Serial No. 95,813. (No model.)

*To all whom it may concern:*

Be it known that I, BOYD W. ALLEN, a citizen of the United States, residing in Boston, in the county of Suffolk and State of Massachusetts, have invented a new and useful Improvement in Wall-Plates or Shields for Electric Wires, of which the following is a specification.

This invention is a plate or shield intended to cover the ends of electric wires which extend through the wall of a building or room when said wires are not connected with an electric fixture, thereby preventing the unsightly appearance exhibited by the ends of unused wires and by the usually somewhat roughly-finished aperture through which the wires extend or the tube therein or to allow said wires to extend through the plate or shield and be insulated therefrom.

The nature of the invention is fully described below and illustrated in the accompanying drawings, in which—

Figure 1:
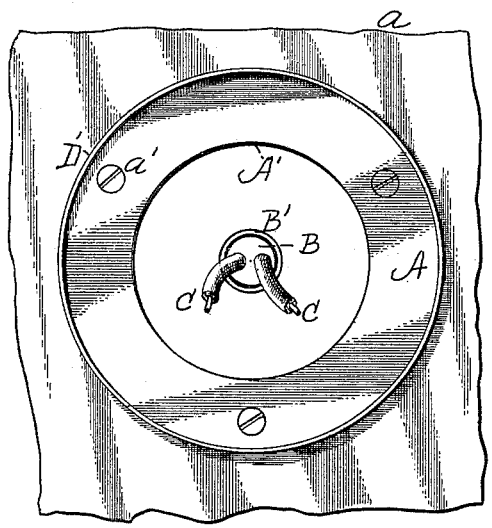
Figure 2:
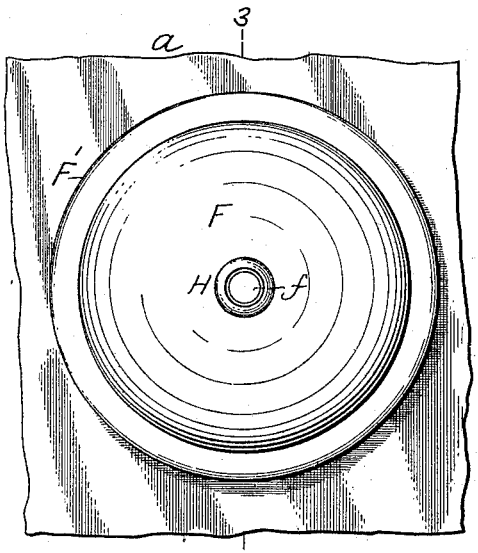
Figure 3:
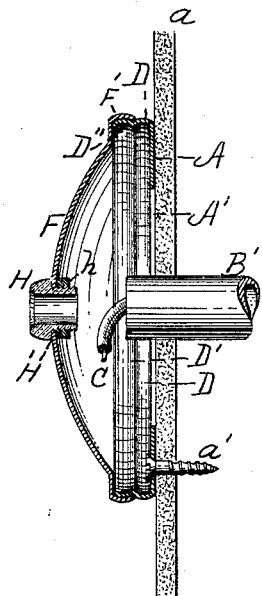

Figure 1 is a front view of my device applied to the inner wall of a building with the cover removed. Fig. 2 is a front view of the entire device. Fig. 3 is a section taken on line 3, Fig. 2.

Similar letters of reference indicate corresponding parts.

A represents the flat portion of a circular ring-shaped plate secured to the building-wall $a$ by suitable screws $a'$ around the hole B in the wall, through which extend the ends of electric wires C through a pipe B'. This hole B is therefore central in the hole A' of the ring-shaped plate and is apt to be very unsightly and ragged in appearance. The plate A, which is usually of brass or other suitable material, has its periphery formed up into a flange, which consists of two parallel curvatures D and D', separated by a groove D'', each curvature being convexo-concave in cross-section.

F represents a cover preferably convexo-concave in cross-section and provided with an annular flange F', which springs over and fits upon the portion D' of the flange, making an integral part of the ring-shaped plate A, the extreme inner edge of the flange F' resting in the groove D''. The plate F is centrally perforated at $f$, and the perforation is provided with a tube H, made of insulating material, said tube being held in position by means of a suitable nut $h$ on its inner and externally-threaded portion and by an integral shoulder H', which sets against the outer surface of the cover F.

The entire plate or shield may be made of brass, is ornamental in appearance, and practically hides completely the ends of the wires C and the hole B and pipe B' therein, and when the wires are ready to be connected with the light-wires they can be drawn through the tube H, which will insulate them from the metallic shield, the shield being sprung off from the plate A in order to reach the wires or not, as desired.

Having thus fully described my invention, what I claim, and desire to secure by Letters Patent, is—

A wall-plate or shield for electric wires, comprising a plate adapted to be secured to the wall around the aperture through which the electric wires extend, said plate being formed with a central hole through which said wires can project, and with a peripheral flange extending forward therefrom; a cover provided with a peripheral flange adapted to fit over and be thereby secured to the flange of the said plate, said cover being provided with a central hole; and a tube or ring of non-conductive material secured to the cover within said central opening, substantially as set forth.

In testimony whereof I have signed my name to this specification in the presence of two subscribing witnesses.

BOYD W. ALLEN.

Witnesses:
HENRY W. WILLIAMS,
A. N. BONNEY.